United States Patent [19]

Nagashima et al.

[11] Patent Number: 5,246,267
[45] Date of Patent: Sep. 21, 1993

[54] ARMREST MOUNTING STRUCTURE IN AUTOMOTIVE SEAT

[75] Inventors: Hideo Nagashima; Yasuo Ohnuma, both of Akishima, Japan

[73] Assignee: Tachi-S Co., Ltd., Akishima, Japan

[21] Appl. No.: 778,094

[22] Filed: Oct. 23, 1991

[51] Int. Cl.$^5$ .............................................. A47C 7/54
[52] U.S. Cl. .............................. 297/113; 297/411.32; 297/411.2
[58] Field of Search ............ 297/113, 27, 28, 35, 297/112, 114, 115, 117, 146, 251, 359, 394, 411, 412, 417, 422

[56] References Cited

U.S. PATENT DOCUMENTS

| 2,584,481 | 2/1952 | Mast et al. | 297/115 |
| 2,824,599 | 2/1958 | Quinlan | 297/146 |
| 4,466,664 | 8/1984 | Kondou | 297/411 |
| 4,759,583 | 7/1988 | Schrom et al. | 297/417 X |
| 4,973,017 | 11/1990 | Takagi | 297/146 X |
| 4,986,600 | 1/1991 | Leblanc et al. | 297/112 X |

FOREIGN PATENT DOCUMENTS

| 61-100630 | 6/1986 | Japan . |
| 2-74231 | 6/1990 | Japan . |
| 2-109442 | 8/1990 | Japan . |

Primary Examiner—Peter R. Brown
Attorney, Agent, or Firm—Oldham, Oldham & Wilson Co.

[57] ABSTRACT

An armrest mounting structure in an automotive seat, in which an armrest is provided between a fore-and-aft movable seat cushion frame and a seat back frame which is variable over its inclination angle responsive to the fore-and-aft movement of the seat cushion frame, with such an arrangement that a reinforcing bracket is provided, extending over the seat back and seat cushion frames, and the armrest is partly supported by such reinforcing bracket, so as to increase the strength of the seat back frame for supporting the armrest.

6 Claims, 3 Drawing Sheets

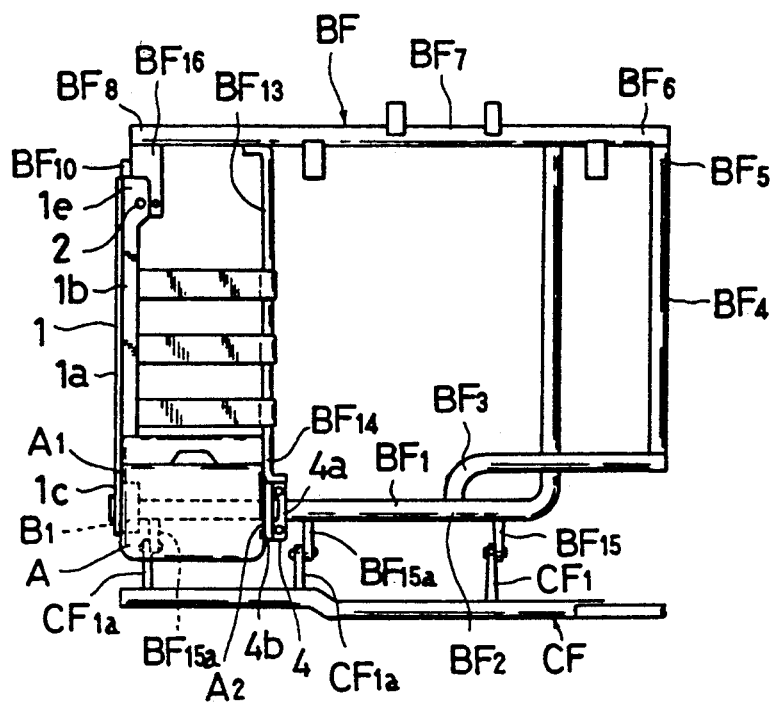
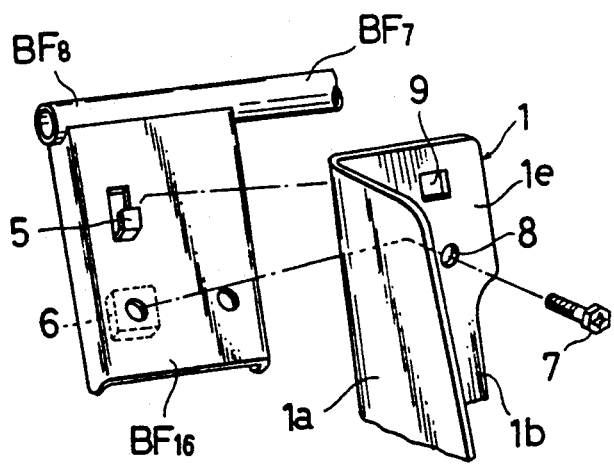
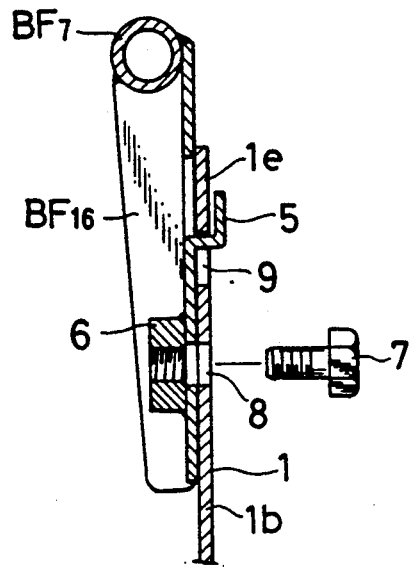

ARMREST MOUNTING STRUCTURE IN AUTOMOTIVE SEAT

BACKGROUND OF THE INVENTION

1. Field of the Invention

The present invention relates to a structure for mounting an armrest in an automotive seat, and is in particular directed to the armrest mounting structure in the seat of type having a fore-and-aft movable seat cushion frame and a seat back frame connected pivotally with the seat cushion frame, with the arrangement that fore-and-aft movement of seat back frame causes angular variation of seat cushion frame relative thereto, and wherein the armrest is pivotally connected to the lower frame section of seat back frame such as to be rotatable between a use position projecting forwardly of the seat and a non-use position resting on the seat back.

2. Description of Prior Art

FIGS. 1 and 2 illustrate an example of conventional armrest mounting structure wherein a seat cushion frame (CF) is of a type movable forwardly and backwardly, forming a seat cushion (SC), and a seat back frame (BF), which forms a seat back (SB), is pivotally connected with the seat cushion frame (CF) such as to be rotatable forwardly and backwardly relative thereto, for allowing inclination angle adjustment of the seat back frame (BF), wherein an an armrest (A) is pivotally connected on the lower side of lower frame section (BF1) of seat back frame (BF). According to this structure, for example, when the seat cushion (SC) is moved forwardly, the upper part of seat back (SB) is lowered along a cabin wall (F) of automobile, while being rotated about the pivot point to vary its inclination angle. Designations (X)(X) denote a pair of bearing members on which the seat back frame (BF) is mounted in a manner to be slidable vertically and rotatable thereabout.

The seat back frame (BF), as viewed from FIG. 2, is formed by the lower frame section (BF1), a right-side part (BF2) thereof, a righ-side lateral frame section (BF4) whose lower end (BF3) is fixed to the right-side part (BF2) of lower frame section (BF1), an upper frame section (BF7), wherein the upper end (BF5) of right-side lateral frame section (BF4) is fixed to the upper frame section (BF7), and a pair of spaced-apart intermediate frame sections (BF12)(BF13) which are extended between the upper and lower frame sections (BF7)(BF1). With regard to the two intermediate frame sections (BF12)(BF13), taking one (BF12) of them for example, its upper part (BF10) and lower part (BF11) are fixed to the left-side end part (BF8) of upper frame section (BF7) and left-side end part (BF9) of lower frame section (BF1).

As seen in FIG. 2, there are a pair of spaced-part forwardly projected arms (B1)(B2), such that the left-side arm (B1) is fixed to a point of the lower frame left-side end part (BF9) to which the lower end (BF11) of left-side intermediate frame section (BF12) is fixed in a manner orthogonal relative thereto, and that the right-side arm (B2) is fixed to a point of the same part (BF9) to which the lower end (BF14) of right-side intermediate frame section (BF13) is likewise fixed orthogonally relative thereto.

As indicated by the phantom line, armrest body (A) is at its rearward end part pivotally supported by the two arms (B1)(B2), such that the armrest body (A) may be moveable between a use position to project generally horizontally for receiving arm of an occupant sitting on the seat and a non-use storage position to be stored in the central storage section in the seat back (SB).

The lower frame section (BF1) is formed with a pair of spaced-apart downwardly projected connecting arms (BF15)(BF15), such that left-side one of the connecting arms is located between the two armrest support arms (B1)(B2) at the left-side end area (BF9) of the lower frame section (BF1), whereas right side one of them is located at the right-side end area (BF2) of the same (BF1).

The seat cushion frame (CF) has a pair of spaced-apart connecting arms (CF1)(CF1) such as to extend in correspondence with the respective two connecting arms (BF15)(BF15) associated with the seat back frame (BF). Those connecting arms (CF1)(BF15) are pivotally connected together in a mutually rotatable way.

Designations (BP) and (CP) denote a seat back padding of seat back (SB) and a seat cushion padding of seat cushion (SC), respectively.

With the above-described conventional armrest mounting structure, however, it has been found as a problem that an entire weight or load of the armrest body (A) is directly transmitted through the arms (B1)(B2) to the left-side end area (BF9) of lower frame section (BF1) which is only supported by the connecting arms (BF15)(CF1). As a result, in view of the two intermediate frame sections (BF12)(BF13) of a thin wire material being simply welded to such left-side end area (BF9), the lower frame section (BF1) is week in strength against the weight of the armrest body (A), and thus such trouble has occured, that the armrest body (A) is unstably moved or wobbled, giving an uneasy feeling to the arm of an occupant sitting on the seat.

SUMMARY OF THE INVENTION

It is a purpose of the present invention to provide an improved armrest mounting structure in an automotive seat which increases the rigidity of a seat back frame for supporting an armrest.

To achieve such purpose, in accordance with the present invention, a reinforcing bracket is provided in the seat back frame in such a manner as to extend from the lower frame member to the upper frame member thereof. To a part of such reinforcing bracket, the armrest is pivotally connected. Thus, a load applied to the armrest is dispersed to both of the upper and lower frame members, thereby avoiding a concentration of load to a local part of seat back frame and thus preventing deformation of same.

It is another purpose of the present invention to disperse the armrest load also to a seat cushion frame which is pivotally connected to the seat back frame.

To this end, in accordance with the present invention, the seat back frame is pivotally connected to the seat cushion frame at three points, such that three connecting arms are formed from both of the two frames and pivotally connected together. In particular, it is preferable that two pivotal connection points be defined where the armrest is rotatably supported in the seat back frame. This allows the armrest load to be effectively distributed to the seat cushion frame, and increasing rigidity at the armrest mounting area by virtue of such two pivotal connecting points.

In one aspect of the invention, the reinforcing bracket serves as a wall to prevent invasion of a foamable base material into the armrest mounting or storage area in the seat back frame during the process for foaming together a padding and seat back frame in a mold.

BRIEF DESCRIPTION OF THE DRAWINGS

FIG. 4 is partly broken plan view of pricipal part of the invention;

FIG. 5 is a partly broken perspective view of another embodiment of the invention; and FIG. 6 is a sectional view of such another embodiment as in the FIG. 5.

DETAILED DESCRIPTION OF PREFERRED EMBODIMENTS OF THE INVENTION

At first, it should be understood that the present invention is directed to an improvement based on the previously stated prior art and since hereinafter reference will be made to common elements of prior art, all like designations in the prior art description above correspond to all like ones used in the present description, without specific explanation thereon.

Figure 1:
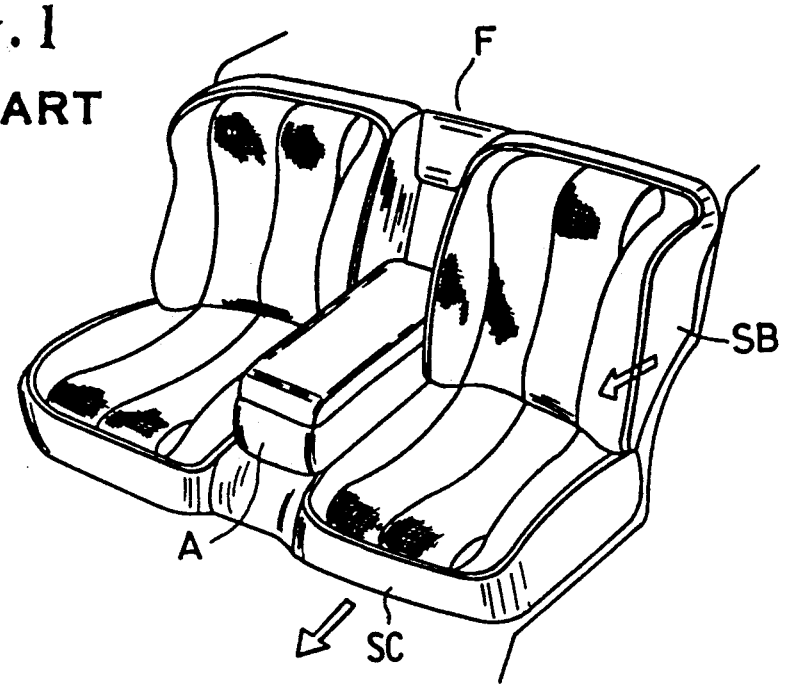
FIG. 1 is a perspective view of an automotive seat in which a conventional armrest mounting structre is provided.
Figure 2:
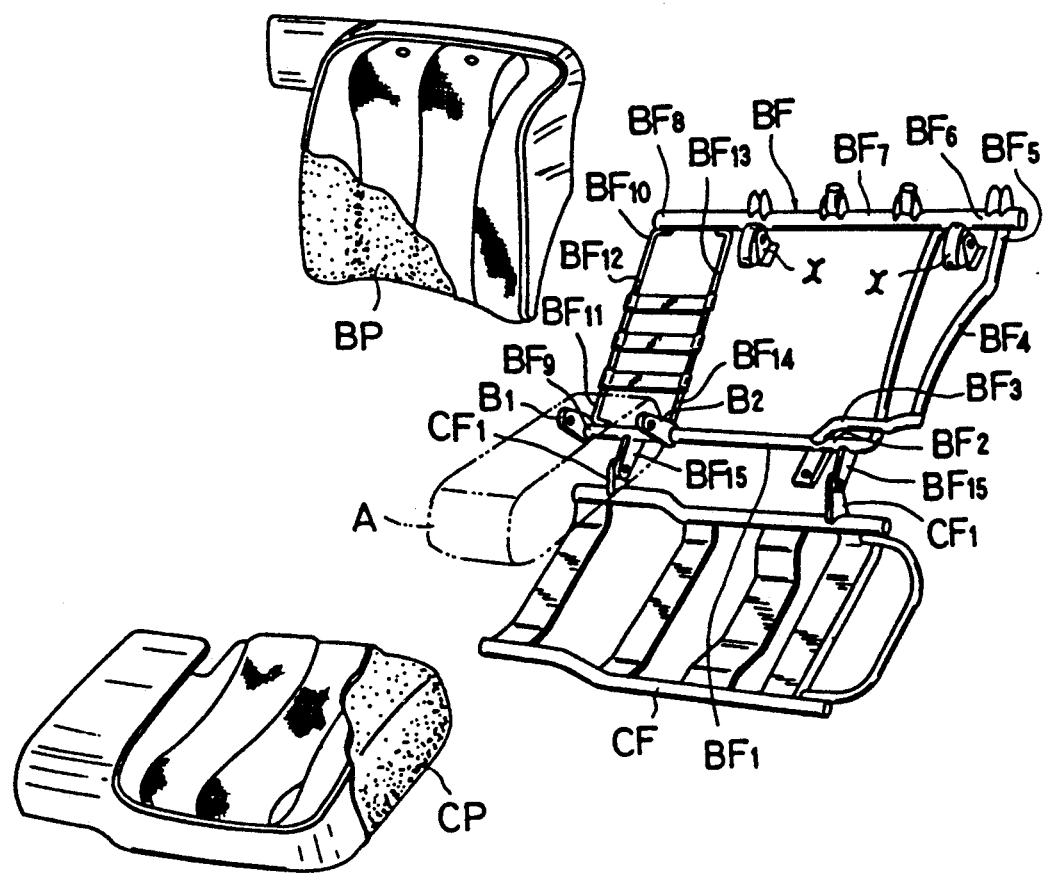
FIG. 2 is a partly broken and exploded, perspective view of a framework of the seat, showing the conventional structure for mounting the armrest.
Figure 3:
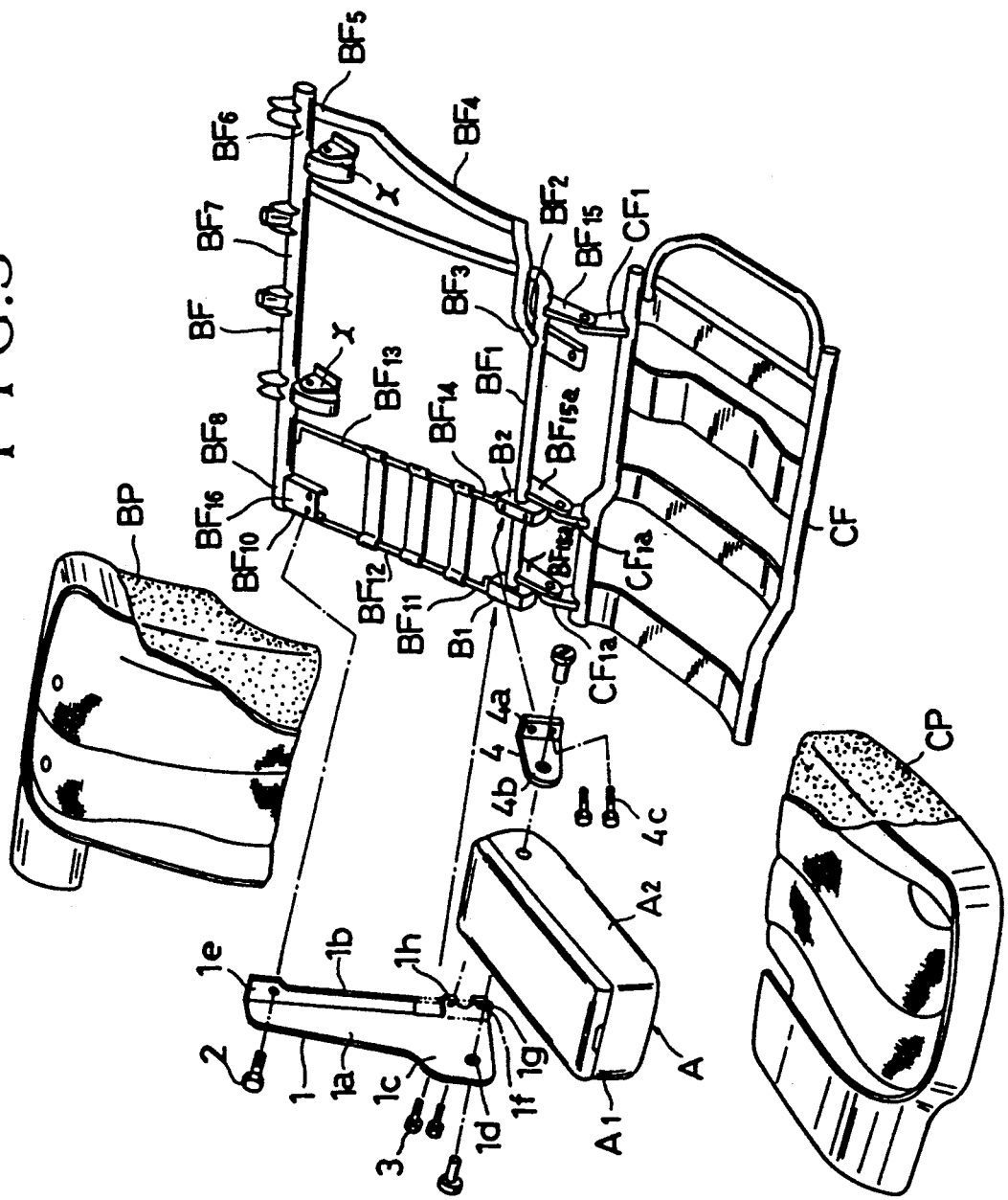
FIG. 3 is a partly broken and exploded, perspective view showing an armrest mounting structure in accordance with the present invention.

FIGS. 3 and 4 show a first embodiment of armrest mounting structure in accordance with the present invention, which is distinguished over the prior art structure in terms of mounting the armrest (A) onto the seat back frame (BF).

In the present embodiment, designation (1) represents a reinforcing bracket. The reinforcing bracket (1) comprises a plate-like armrest mounting section (1a) to which the right-side lateral wall of armrest body (A) is rotatably provided, and a plate-like securing section (1b) which is bent from the armrest mounting section (1a) at generally a right angle relative thereto.

The armrest mounting section (1a) is of a length equal to that of armrest body (A), and has, formed at its lower end area, a forwardly projected coplanar part (1c) and a pair of securing lugs (1h). In the projected coplanar part (1c), a securing hole (1d) is formed, by way of which the base part of armrest (A) is pivotally secured on the seat back frame side (BF). In the upper end part of securing section (1b), there is defined a securing area (1e).

At a lower point designated by (1f) in the securing section (1b), there is defined an L-shaped area (1g) extending in a direction opposite to the armrest mounting section (1a) and terminating in the foregoing two securing lugs (1h).

Designation (4) denotes a generally L-shaped bracket.

As seen in FIG. 3, a securing bracket (BF16) is provided at the left-side end area (BF8) of upper frame section (BF), such that the base edge of the securing bracket (BF16) is welded to that upper frame section end area (BF8) and one lateral (on the left side) edge of same bracket (BF16) is welded to the left-side intermediate frame section (BF12). Further, at the left-side end area (BF9) of lower frame section (BF1), a pair of securing blocks (B1)(B2) are fixed in such a manner that they are spaced apart from each other a distance equal to that of the two intermediate frame sections (BF12)(BF13), extending across the lower frame section (BF1) in an orthogonal relation therewith, so that the lower ends respectively of the two intermediate frame sections (BF12)(BF13) are fixed to each upper wall of the two securing blocks (B1)(B2). As viewed from FIG. 3, the left-side securing block (B1) has a securing surface defined at its outer lateral wall, though not clearly shown, in which securing surface, the securing lugs (1h) of reinforcing bracket (1) is secured, while on the other hand, the right-side securing block (B2) has a securing surface defined at its frontal wall, in which securing surface, the L-shaped support bracket (4) is secured.

In FIG. 3, a pair of connecting arms (BF15a)(BF15a) are depicted to be fixed at the lower frame section end area (BF9) such that each of those arms adjoins the foregoing two securing blocks (B1)(B2), respectively. Likewise, another pair of connecting arms (CF1a)(CF1a) are depicted to be fixed at the left-side end area of seat cushion frame (CF) in such a manner as to be pivotally connected with the two respective connecting arms (BF15a)(BF15a) of seat back frame (BF).

The reinforcing bracket (1) and L-shaped support bracket (4) are respectively connected by pivots to the left-side and right-side lateral walls (A1)(A2) of armrest body (A) in a free-to-rotate manner. The securing of such armrest body (A) to the left-side end area of seat back frame (BF) is such that the the upper securing area (1e) of reinforcing bracket (1) is firmly secured by a bolt (2) to the securing bracket (BF16), the securing lugs (1h) of same seat back frame (BF) are firmly secured by bolts (3) to the lateral securing surface of left-side securing block (B1), and the L-shaped support bracket (4) is at its base part (4a) firmly secured to the frontal securing surface of right-side securing block (B2) by means of bolts (4c). It is therefore seen that the reinforcing bracket (1) extends between the upper and lower frame sections (BF7)(BF1).

With the present embodiment constructed above, it is to be appreciated that the weight of armrest body (A) is effectively dispersed into the reinforcing bracket (1), thus being partly transmitted to the upper frame section (BF7), and into each of the two connnection points (BF15a, CF1a)(BF15a, CF1a): Namely, the armrest weight are dispersed at those three points and not intensively exerted on the lower frame section (BF1), and thus, the armrest (A) is supported stably at the seat back frame (BF) against wobbling. Further, the L-shaped area (1g) and securing lugs (1h) presents a coplanar support wall to the left-side lateral wall (A1) of armrest body (A), thereby fully supporting the armrest body (A) which is located at the use position projecting horizontally from the seat back (SB), whereby the armrest body (A) at the use position is positively supported against lateral unstable movements. Still further, the forwardly projected armrest securing part (1a) presents an elongated wall which supports the armrest body (A) generally along its entire longitudinal length, when the armrest body (A) is located at the non-use position resting on the seat back side. Thus, at the non-use position, the armrest body (A) is also positively supported against lateral unstable movements.

FIGS. 5 and 6 show a second embodiment of the present invention which is directed to an improvement of the above-stated securing bracket (BF16) and upper securing part (1e) of reinforcing bracket (1).

In this particular embodiment, in the securing bracket (BF16), an L-shaped engagement lug (5) is formed by way of punching out the corresponding part of the bracket (BF16) such as to project forwardly thereof, and a securing nut part (6) is formed below the L-shaped engagement lug (5). On the other hand, at the upper securing area (1e) of reinforcing bracket (1), there are formed an engagement aperture (9) into which the engagement lug (5) is engaged, and a securing hole (8) which is to be aligned coaxially with the threaded hole of securing nut part (6).

Accordingly, once the engagement lug (5) is latchingly engagement into the engagement hole (9), it is easy to position the securing hole (8) precisely in alignment with the nut hole (6) and a securing bolt (7) can readily be threadedly inserted through the nut hole (6), to firmly secure the upper securing area (1e) of reinforcing bracket (1) to the mating securing bracket (5).

It is noted that both paddings (BP)(CP) have in advance been foamed integrally with the respective seat back frame (BF) and seat cushion frame (CF) in a suitable foaming mold. In this respect, the reinforcing bracket (1) serves to prevent leakage of a foamable base material into the intermediate frame sections (BF12)(BF13) during foaming process for the seat back padding (BP).

Finally, the present invention is not limited to the illustrated embodiment, but any other modifications, replacements and additions may structurally be possible without departing from the scopes and spirits of the appended claims. For instance, another reinforcing bracket similar to the one (1) may be provided along the right-side intermediate frame section (BF13), instead of support bracket (4). This completely prevents invasion of foamable base material into the armrest storage area between the two intermediate frame sections (BF12)(BF13) during the process for forming the seat back padding (BP) together with the seat back frame (BF) in a mold, not to mention more rigid support structure for the armrest body (A) in the seat back (SB).

What is claimed is:

1. An armrest mounting structure in an automotive seat, in which said seat includes a seat cushion frame for a seat cushion which is movable forward and backward, a seat back frame for a seat back which is pivotally connected with said seat cushion frame, such as to be rotatable responsive to forward and backward movement of said seat cushion frame for variation of an inclination angle relative thereto, and an armrest body is pivotally connected via a bracket means to said seat back frame, characterized in that:

said bracket means comprises a bracket and a reinforcing bracket;

said bracket is fixedly secured to a lower frame section of said seat back frame;

said reinforcing bracket is shaped generally in an "L" configuration, having an upper portion fixedly secured to an upper frame section of said seat back frame, a lower portion fixedly secured to said lower frame section of the same seat back frame, and a forwardly projected portion extending from a plane of the same seat back frame, wherein said forwardly projected portion is defined along a longitudinal direction of said reinforcing bracket; and said reinforcing bracket is formed such that an upper securing part is defined at an upper end area of said reinforcing bracket, and a lower outwardly projected securing part is defined at said lower end area of said reinforcing bracket so as to extend in a opposite direction to the forwardly projected portion, wherein said armrest body is pivotally supported by said bracket and said forwardly projected portion of said reinforcing bracket, and wherein said reinforcing bracket forms a side wall which acts to support a lateral wall of said armrest body when said armrest body is located in a non-use position to be stored at said seat back frame.

2. The armrest mounting structure as defined in claim 1, wherein said upper and lower portions of said reinforcing bracket are fixedly secured by means of bolts and nuts to said upper and lower frame sections of said seat back frame, respectively.

3. The armrest mounting structure as defined in claim 1, wherein said bracket is fixedly secured by means of bolts and nuts to said lower frame section of said seat back frame.

4. The armrest mounting structure as defined in claim 1 whereby, said lower frame section of said seat back frame is pivotally connected on said seat cusion frame by jointing means, and the weight of said armrest body is dispersed into said reinforcing bracket and transmitted through said jointing means for further dispersion.

5. The armrest mounting structure as defined in claim 1, wherein a securing bracket is provided at an upper frame section of said seat back frame, so that said upper securing part of said reinforcing bracket is firmly secured to said securing bracket, and wherein a securing block is provided at said lower frame section of said seat back frame, so that said lower securing part of said reinforcing bracket is firmly secured to said securing block.

6. The armrest mounting structure as defined in claim 5, wherein said upper securing part of said reinforcing bracket is formed with an engagement hole and said securing bracket is formed with an engagement lug to be engaged latchingly into said engagement hole.

* * * * *